United States Patent
Abrari et al.

(10) Patent No.: US 11,428,119 B2
(45) Date of Patent: Aug. 30, 2022

(54) METHOD AND SYSTEM TO PROMOTE ICE SHEDDING FROM ROTOR BLADES OF AN AIRCRAFT ENGINE

(71) Applicant: PRATT & WHITNEY CANADA CORP., Longueuil (CA)

(72) Inventors: Farid Abrari, Mississauga (CA); Walid Mohammed, Ancaster (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 230 days.

(21) Appl. No.: 16/718,790

(22) Filed: Dec. 18, 2019

(65) Prior Publication Data
US 2021/0189903 A1    Jun. 24, 2021

(51) Int. Cl.
*F01D 25/02* (2006.01)
*B64D 15/00* (2006.01)
*B64D 27/16* (2006.01)

(52) U.S. Cl.
CPC .............. *F01D 25/02* (2013.01); *B64D 15/00* (2013.01); *B64D 27/16* (2013.01)

(58) Field of Classification Search
CPC .......... F01D 25/02; B64D 15/00; B64D 27/16
See application file for complete search history.

(56) References Cited

U.S. PATENT DOCUMENTS

| | | | |
|---|---|---|---|
| 8,869,537 B2 | 10/2014 | Geis et al. | |
| 9,580,182 B2 | 2/2017 | Leschi et al. | |
| 9,683,489 B2 * | 6/2017 | Dischinger | F02C 7/047 |
| 2016/0138419 A1 * | 5/2016 | Kray | F01D 5/282 |
| | | | 415/208.1 |
| 2018/0230853 A1 | 8/2018 | Jastrzembowski et al. | |

FOREIGN PATENT DOCUMENTS

JP    4915745 B2    4/2012

OTHER PUBLICATIONS

European Patent Office, Communication re. extended European search report dated for European patent application No. 20215769.9, dated May 14, 2021.

English translation of Japanese patent document No. JP 4915745 dated Apr. 11, 2012, https://patents.google.com/patent/JP4915745B2/en?oq=JP4915745, accessed on Aug. 12, 2021.

* cited by examiner

*Primary Examiner* — Michael L Sehn
(74) *Attorney, Agent, or Firm* — Norton Rose Fulbright Canada LLP

(57) ABSTRACT

A method of operating an aircraft engine having a bladed rotor coupled thereto during an icing condition is provided. The method comprises controlling the aircraft engine to alternatingly achieve an ice accretion rotational speed of the bladed rotor at which ice accretion on blades of the bladed rotor occurs, and a reduced rotational speed of the bladed rotor to promote ice shedding from the blades of the bladed rotor. The reduced rotational speed is lower than the ice accretion rotational speed.

20 Claims, 9 Drawing Sheets

600

610 — Controlling the aircraft engine to alternatingly achieve a nominal rotational speed of the bladed rotor at which ice accretion on blades of the bladed rotor occurs, and a reduced rotational speed of the bladed rotor to promote ice shedding from the blades of the bladed rotor, the reduced rotational speed being lower than the nominal rotational speed.

620 — Operating a second aircraft engine having a second bladed rotor coupled thereto by controlling the second aircraft engine to alternatingly achieve a second nominal rotational speed of the second bladed rotor at which ice accretion on blades of the second bladed rotor occurs, and a second reduced rotational speed of the second bladed rotor to promote ice shedding from the blades of the second bladed rotor, the second reduced rotational speed being lower than the second nominal rotational speed.

FIG. 4

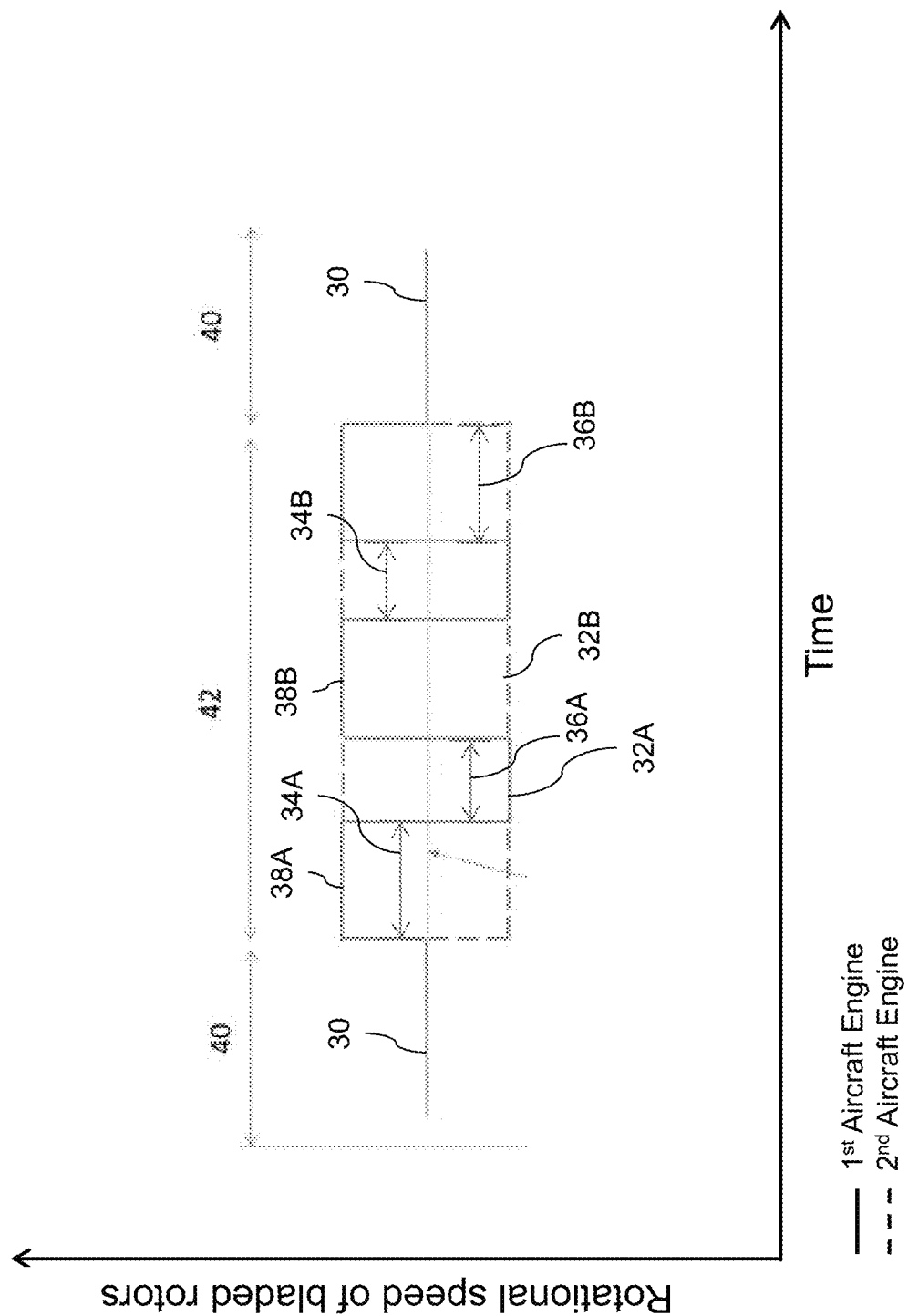

METHOD AND SYSTEM TO PROMOTE ICE SHEDDING FROM ROTOR BLADES OF AN AIRCRAFT ENGINE

TECHNICAL FIELD

The disclosure relates generally to aircraft engines, and more particularly to systems and methods for mitigating or preventing ice accumulation on rotor blades of such engines.

BACKGROUND

Some atmospheric conditions can cause ice to build up on parts of an aircraft including on blades of bladed rotors of aircraft engines. The ice accumulated on rotor blades is undesirable as the ice changes the aerodynamic characteristics of the blades by changing the outer shape of the blades. This can negatively affect the aerodynamic performance of the blades of the bladed rotor and consequently affect the performance of the aircraft engine. Improvement is desirable.

SUMMARY

In one aspect, the disclosure describes a method of operating an aircraft engine having a bladed rotor coupled thereto during an icing condition. The method comprises controlling the aircraft engine to alternatingly achieve an ice accretion rotational speed of the bladed rotor at which ice accretion on blades of the bladed rotor occurs, and a reduced rotational speed of the bladed rotor to promote ice shedding from the blades of the bladed rotor, the reduced rotational speed being lower than the ice accretion rotational speed.

In another aspect, the disclosure describes a method of operating an aircraft engine having a bladed rotor coupled thereto during an icing condition. The method comprises:

operating the aircraft engine to achieve a rotational speed of the bladed rotor at which ice accretion on blades of the bladed rotor occurs;

promoting ice to shed from the blades of the bladed rotor by operating the aircraft engine to reduce the rotational speed of the bladed rotor; and after promoting ice shedding from the blades of the bladed rotor, operating the aircraft engine to increase the rotational speed of the bladed rotor.

In a further aspect, the disclosure describes a system to promote ice shedding from blades of a bladed rotor of an aircraft engine. The system comprises:

one or more data processors operatively coupled to control a rotational speed of the bladed rotor; and non-transitory machine-readable memory storing instructions executable by the one or more data processors and configured to cause the one or more data processors to:

generate an output causing the bladed rotor to alternatingly achieve a ice accretion rotational speed of the bladed rotor at which ice accretion on blades of the bladed rotor occurs, and a reduced rotational speed of the bladed rotor to promote ice shedding from the blades of the bladed rotor, the reduced rotational speed being lower than the ice accretion rotational speed.

Further details of these and other aspects of the subject matter of this application will be apparent from the detailed description included below and the drawings.

DESCRIPTION OF THE DRAWINGS

Reference is now made to the accompanying drawings, in which:

FIG. 4 is a flowchart of another method of operating an aircraft engine during an icing condition;

FIG. 5C is another graph of rotational speeds of two bladed rotors of two respective aircraft engines versus time;

DETAILED DESCRIPTION

The following disclosure relates to methods and systems for operating (e.g., turbofan) aircraft engines having bladed rotors (e.g., fans) during icing conditions. In various embodiments, the methods and systems disclosed herein may promote ice shedding from the blades of bladed rotors of aircraft engines by momentarily reducing the rotational speed of the bladed rotor during flight of an aircraft to which the engine is mounted. For example, alternatingly changing the speed of the bladed rotor between a higher (ice accretion) rotational speed and a lower (ice shedding) rotational speed may be used to limit an amount of ice accumulation on the blades. In some situations, the systems and methods disclosed herein may also reduce the likelihood of asymmetric shedding of ice from the rotor blades which can cause asymmetric loading on the blades and vibrations. The systems and methods disclosed herein may be used on single-engine or multi-engine aircraft.

Aspects of various embodiments are described in relation to the figures.

Figure 1:
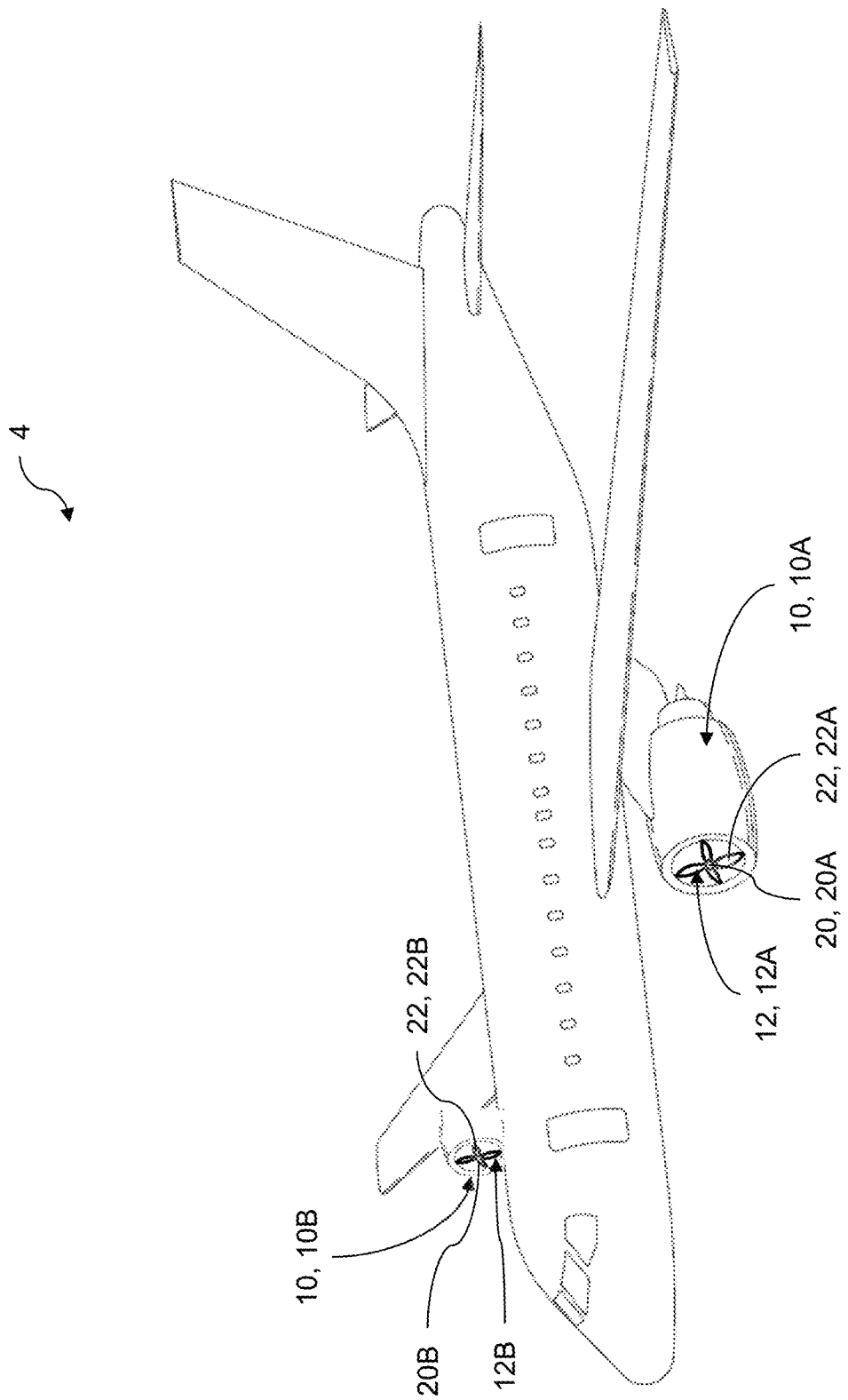
FIG. 1 is a perspective view of an exemplary aircraft having aircraft engines mounted thereto.

FIG. 1 is a perspective view of an exemplary aircraft 4 having one or more aircraft engines 10 mounted thereto. The aircraft 4 may be any fixed-wing aircraft, such as a general aviation aircraft or commercial airliner.

The aircraft 4 may be a single-engine or multi-engine (e.g., twin-engine) aircraft. The aircraft engine 10 may be configured to provide propulsion to the aircraft to aid in moving the aircraft 10 through the surrounding fluid medium, e.g. air or clouds.

Aircraft engine 10 may include a conventional or other type of gas turbine engine suitable for use in aircraft applications. For example, engine 10 may be a turbofan gas turbine engine. The aircraft engine 10 includes a bladed rotor 12 such as a fan of a turbofan engine or other bladed rotor exposed to the ambient air. The bladed rotor 12 may be configured to drive the ambient air, e.g. by establishing a pressure gradient along an axial direction of the bladed rotor 12. The bladed rotor 12 may include a hub 20 having blades 22 (airfoils) extending radially therefrom and distributed circumferentially around the hub 20. The blades 22 of the bladed rotor 12 are exposed to the ambient air.

In some embodiments, aircraft engine 10 may be an electric motor configured to drive a bladed rotor 12. In some embodiments, the bladed rotor 12 may be driven to generate propulsive thrust. In some embodiments, the bladed rotor 12 may be driven to control an orientation of an aircraft 4.

The aircraft engine 10 may be operated to control/change a rotational speed of the bladed rotor 12. For example, for a combustion-based aircraft engine 10, a fuel flow to a combustor of the engine 10 may be throttled to reduce a rotational speed of the bladed rotor 12 and increased to increase the rotational speed of the bladed rotor 12. For electric motor embodiments of the aircraft engine 10, an amount of electric power (e.g., current) delivered to the electric motor may be modified to change a rotational speed of the bladed rotor 12.

The aircraft 4 shown in FIG. 1 has two engines labelled 10A (first aircraft engine) and 10B (second aircraft engine). Each engine 10 has bladed rotors labelled 12A (first bladed rotor) and 12B (second bladed rotor). Each of the bladed rotors 12 has a hub, labelled 20A (first hub) and 20B (second hub), and blades attached thereto, labelled 22A (first blade(s)) and 22B (second blade(s)). The aircraft engines 10A, 10B may be installed symmetrically on opposite sides of a line of symmetry of the aircraft 4. The first aircraft engine 10A may be attached to a first side of the aircraft 4, and the second aircraft engine 10B may be attached to a second side of the aircraft 4 opposite the first side of the aircraft 4. The engines 10 may be mounted to the wings and/or to the fuselage of the aircraft 4.

When the aircraft 4 is in operation in flight or on the ground, ice may accumulate on surfaces (e.g., of blades 22) exposed to the ambient environment in some atmospheric conditions that promote ice formation (referred herein as "icing condition"). The atmospheric conditions associated with a potential icing condition for outside surfaces of an aircraft may vary depending on meteorological parameters. Such meteorological parameters may include one or more of ambient temperature, concentration of water in the ambient outside air, and the mean volume diameter of the water droplets contained in the ambient air. For example, the concentration of liquid water in the ambient air may be identified by icing detectors and/or by specific probes, for example. The mean volume diameter of droplets of water contained in the ambient air may be identified by laser droplet size probes, such as forward scattering spectrometer probes or cloud droplet probes. Accordingly, the presence of a potential icing condition may be detected using one or more suitable sensors.

Other criteria based on the perception of an aircraft user, such as a pilot or other operator, may also potentially be taken into account for identifying a potential icing condition for the aircraft engine 10, such as a variation in the flying behavior of the aircraft 4 or operational (e.g., vibratory) behaviour of the aircraft engine 10. Accordingly, the pilot or operator of the aircraft 4 may determine the presence of a potential icing condition based on information perceivable (visual inspection of ice on an outer surface of the aircraft 4) by the pilot optionally in combination with information acquired using one or more sensors. For example, the aircraft user may identify an icing condition on the basis of values for meteorological parameters as supplied by the on-board instrumentation of the aircraft 4 and/or by a weather station, and on the basis of the user's own experience of the impact of meteorological conditions on the likelihood of ice accretion on the blades 22. A system for promoting ice shedding from the blades 22 as described herein may be activated either manually by an aircraft user or automatically by a controller as a result of the icing condition being identified.

Figure 2:
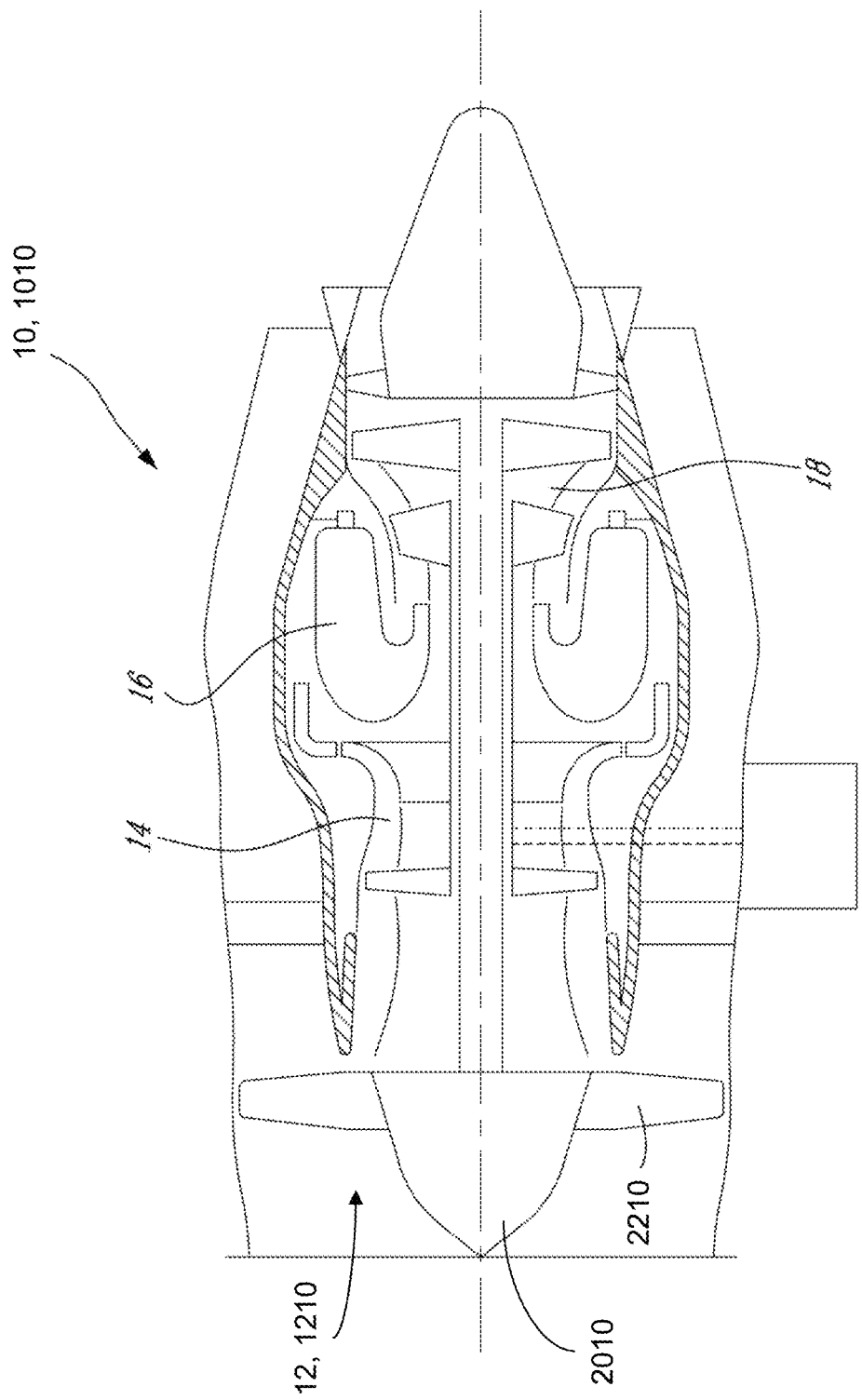
FIG. 2 is a schematic axial cross-section view of an exemplary turbo-fan gas turbine engine.

FIG. 2 illustrates a turbofan engine 1010, as an example of the aircraft engine 10, of a type preferably provided for use in subsonic flight, generally comprising in serial flow communication, a multistage compressor 14 for pressurizing air received through an inlet of the gas turbine engine 10, a combustor 16 in which the compressed air is mixed with fuel and ignited for generating an annular stream of hot combustion gases, and a turbine section 18 for extracting energy from the combustion gases.

The turbofan engine 1010 may include a fan 1210 as an example of the bladed rotor 12. The energy extracted from the combustion chamber 16 via turbines in the turbine section 18 drives a shaft which in turn drives the fan 1210. The fan 1210 includes a fan hub 2010 and a fan blade 2210. During operation of the turbofan engine 1010, the fan blade 2210 exposed to the ambient air may be subjected to an icing condition causing ice to accumulate on the fan blade 2210.

The thrust generated by the gas turbine engine 1010 may be varied by changing the rotational speed of the bladed rotor 12. The rotational speed of the bladed rotor 12 may be varied by adjusting a flow of fuel to the combustor 16.

Figure 3:
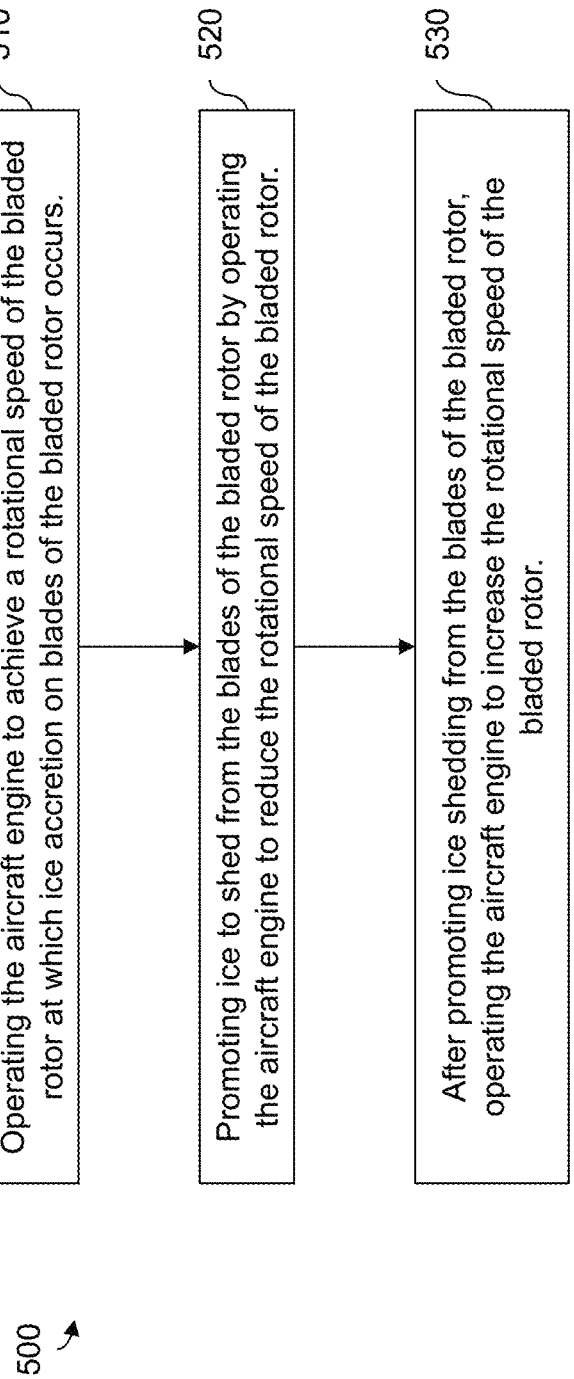
FIG. 3 is a flowchart of a method of operating an aircraft engine during an icing condition.

FIG. 3 is a flowchart of a method 500 of operating an aircraft engine 10 having a bladed rotor 12 coupled thereto during an icing condition. The method 500 includes operating the aircraft engine 10 to achieve a first rotational speed of the bladed rotor 12 at which ice accretion on blades 22 of the bladed rotor 12 occurs (block 510), promoting ice shedding from the blades 22 of the bladed rotor 12 by operating the aircraft engine 10 to reduce a rotational speed of the bladed rotor 12 (block 520), and after promoting ice shedding from the blades 22 of the bladed rotor 12, operating the aircraft engine 10 to increase the rotational speed of the bladed rotor 12 (block 530).

Method 500 may be conducted during flight of an aircraft to which the aircraft engine 10 is mounted. In some embodiments, promoting ice shedding from blades 22 of the bladed rotor 12 by operating the aircraft engine 10 to reduce the rotational speed of the bladed rotor 12 includes reducing the rotational speed of the bladed rotor 12 to between 95% to 97% of the first rotational speed for example.

In some embodiments, the method 500 includes, when promoting ice shedding from blades 22, 22A of the bladed rotor 12, 12A by operating the aircraft engine 10, 10A to reduce the rotational speed of the bladed rotor 12, 12A, operating a second aircraft engine 10B having a second bladed rotor 12B coupled thereto to achieve a second rotational speed of the second bladed rotor 12B at which ice accretion on blades 22B of the second bladed rotor 12B occurs.

In some embodiments, the method 500 includes, when operating the aircraft engine 10, 10A to achieve a first rotational speed of the bladed rotor 12, 12A at which ice accretion on blades 22, 22A of the bladed rotor 12, 12A occurs, promoting ice shedding from blades 22B of the second bladed rotor 12B by operating the second aircraft engine 10B to reduce a rotational speed of the bladed rotor 12B.

FIG. 4 is a flowchart of a method 600 of operating an aircraft engine 10 having a bladed rotor 12 coupled thereto during an icing condition. The method 600 includes block 610 of controlling the aircraft engine 10 to alternatingly achieve a nominal rotational speed of the bladed rotor 12 at which ice accretion on blades 22 of the bladed rotor 12 occurs, and a reduced rotational speed of the bladed rotor 12 to promote ice shedding from the blades 20 of the bladed rotor 12, the reduced rotational speed being lower than the nominal rotational speed.

In some embodiments of the method 600, the nominal rotational speed 30 or reduced rotational speed 32 may vary with time depending on the phase of flight of the aircraft 4.

In some embodiments of the method 600, a first time period at which the aircraft engine 10 is controlled to achieve the nominal rotational speed of the bladed rotor 12, 12A is longer than a second time period at which the aircraft engine 10, 10A is controlled to achieve the reduced rotational speed of the bladed rotor 12, 12A. In some embodiments of the method 600, the first time period is more than ten times longer than the second time period. In some embodiments of the method 600, a length of the second time period is based on a severity of ice accumulation on the bladed rotor 12, 12A or the design/configuration of the blades 22 of the bladed rotor 12.

In some embodiments, the method 600 includes monotonically (or non-monotonically) increasing the bladed rotor's rotational speed from the reduced rotational speed to the nominal rotational speed.

In some embodiments, the method 600 includes including monotonically (or non-monotonically) decreasing the bladed rotor's rotational speed from the reduced rotational speed to the nominal rotational speed.

In some embodiments of the method 600, the reduced rotational speed is between 95% and 97% of the nominal rotational speed.

In some embodiments of the method 600, the bladed rotor 12 is a first bladed rotor 12A of a first aircraft engine 10A, the nominal rotational speed is a first nominal rotational speed, and the reduced rotational speed is a first reduced rotational speed. In some such embodiments, the method 600 includes block 620 of operating a second aircraft engine 10B having a second bladed rotor 12B coupled thereto by controlling the second aircraft engine 10B to alternatingly achieve a second nominal rotational speed of the second bladed rotor at which ice accretion on blades 22B of the second bladed rotor 12B occurs, and a second reduced rotational speed of the second bladed rotor 12B to promote ice shedding from the blades 22B of the second bladed rotor 12B, the second reduced rotational speed being lower than the second nominal rotational speed. In some such embodiments of method 600, alternatingly achieving the first nominal rotational speed and the first reduced rotational speed of the first aircraft engine 10A is out-of-phase with alternatingly achieving the second nominal rotational speed and the second reduced rotational speed of the second aircraft engine 10B. The first aircraft engine 10A and the second aircraft engine 10B are mounted to a same aircraft.

In some embodiments of the method 600, the first and second nominal rotational speeds are substantially equal, and the first and second reduced rotational speeds are substantially equal. Accordingly, when the second bladed rotor 12B is rotating at the second reduced rotational speed, the first bladed rotor 12A may be rotating at the first nominal rotational speed. Similarly, when the first bladed rotor 12A is rotating at the first reduced rotational speed, the second bladed rotor 12B is rotating at the second nominal rotational speed. In some embodiments of the method 600, the bladed rotor 12 is a fan and the aircraft engine 10 is a turbofan engine.

Figure 5A:
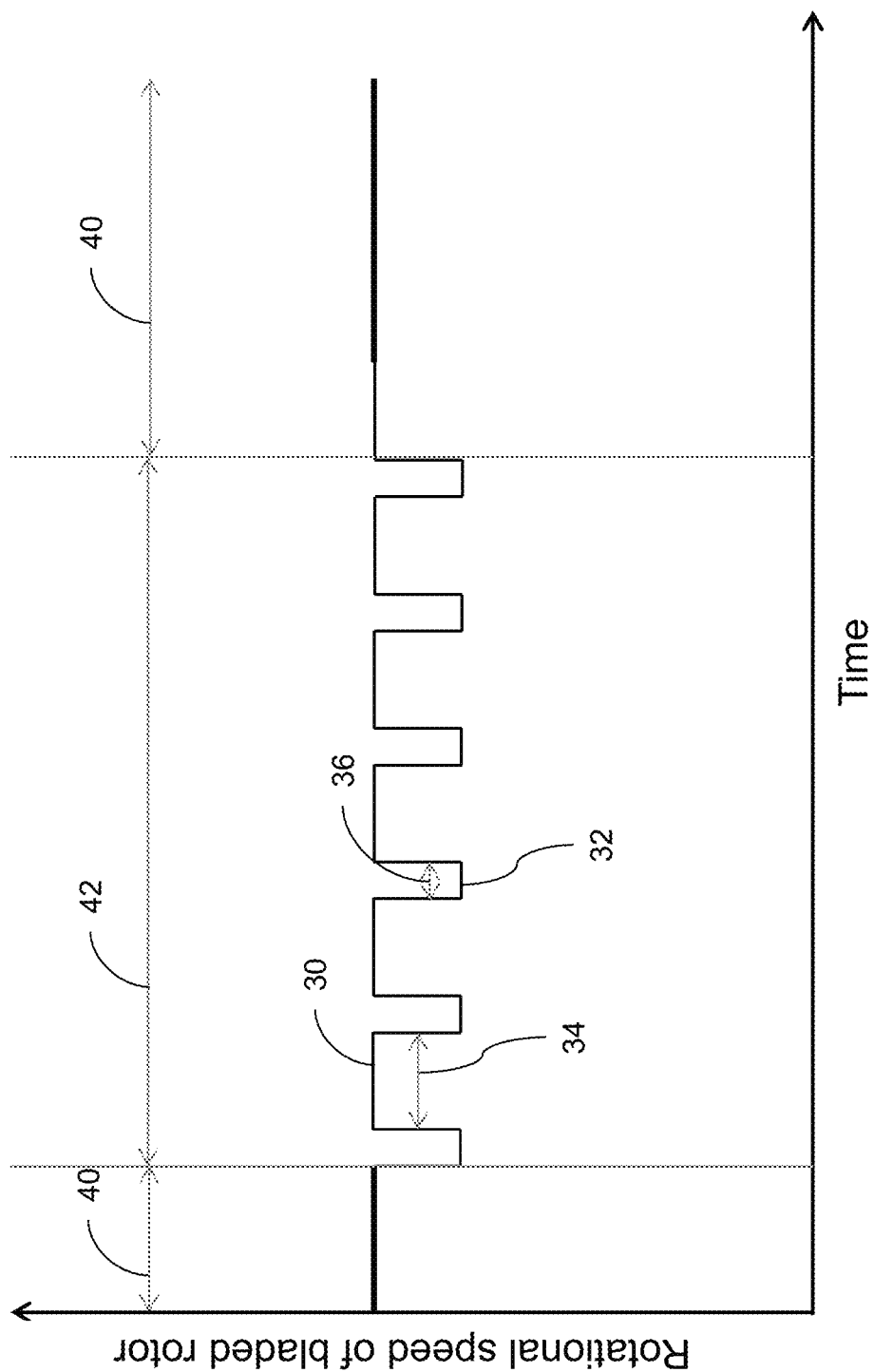
FIG. 5A is a graph of rotational speed of the bladed rotor of an aircraft engine versus time.

FIG. 5A is a graph of rotational speed of the bladed rotor 12 of an aircraft engine 10 versus time. The aircraft engine 10 may be operating in a nominal operating regime 40, wherein the bladed rotor 12 is rotating at a nominal rotational speed 30. The aircraft engine 10 may then enter an icing mitigation regime 42 when an icing condition is identified. During the icing mitigation regime 42, the rotational speed of the aircraft engine 10 may be controllably varied to promote intermittent ice shedding from the blades 22 of the bladed rotor 12. During the icing mitigation regime 42, the rotational speed of the bladed rotor 12 may be repeatedly reduced from the nominal (ice accretion) rotational speed 30 to a reduced rotational speed 32, and thereafter increased again to the nominal rotational speed 30. The rotational speed of the bladed rotor 12 maybe alternatingly varied between the nominal rotational speed 30 and the reduced rotational speed 32. The bladed rotor 12 may be substantially kept at the nominal rotational speed 30 for a first time period 34. The bladed rotor 12 may be substantially kept at the reduced rotational speed 32 for a second time period 36. The cycling between the nominal rotational speed 30 and the reduced rotational speed 32 may have any functional periodic form. The aircraft engine 10 may re-enter the nominal operating regime 40 when the icing condition is over.

Figure 5B:
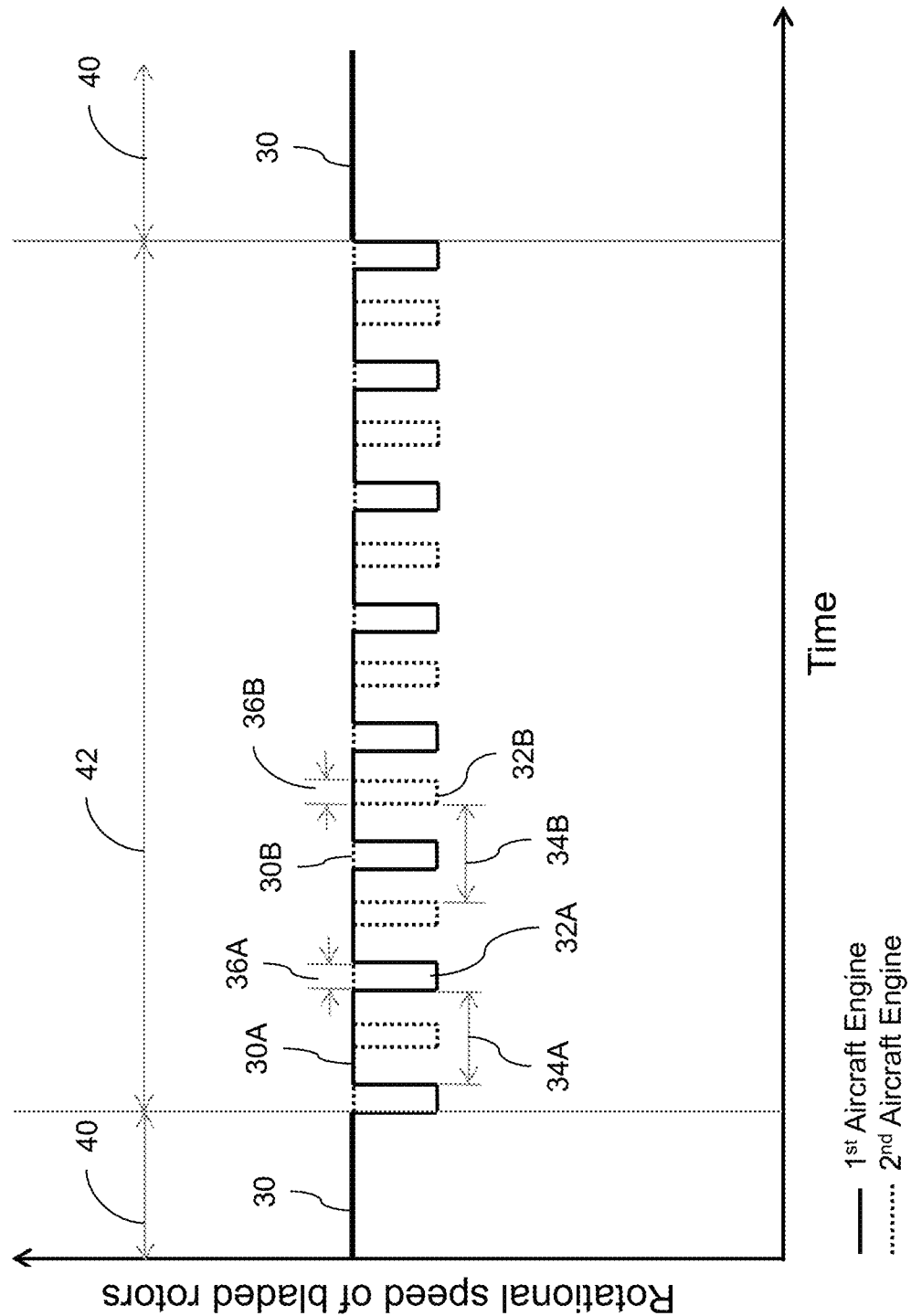
FIG. 5B is a graph of rotational speeds of two bladed rotors of two respective aircraft engines versus time.

FIG. 5B is a graph of rotational speeds of bladed rotors 12A, 12B of different aircraft engines 10A, 10B of an aircraft 4 versus time. The aircraft engines 10A, 10B may be operating in the nominal operating regime 40 where the bladed rotors 12A, 12B may be rotating at the nominal rotational speed 30. When the icing condition is identified, the first and second aircraft engines 10A, 10B may then enter the icing mitigation regime 42.

During the icing mitigation regime 42, the rotational speed of the first aircraft engine 10A may be controllably varied to promote ice shedding from the blades 22A of the first bladed rotor 12A. During the icing mitigation regime 42, the rotational speed of the first bladed rotor 12A may be repeatedly reduced from the first nominal rotational speed 30A to a first reduced rotational speed 32A, and thereafter increased again to the first nominal rotational speed 30A. The rotational speed of the bladed rotor 12A may be alternatingly varied between the first nominal rotational speed 30A and the first reduced rotational speed 32A. The first bladed rotor 12A may be substantially kept at the first nominal rotational speed 30A for a first time period 34A. The bladed rotor 12A may be substantially kept at the first reduced rotational speed 32A for a second time period 36A. The second time period 36A may be shorter than the first time period 34A. The first aircraft engine 10A may re-enter the nominal operating regime 40 when the icing condition is over.

The second aircraft engine 10B may also enter the icing mitigation regime 42 when the icing condition is identified. During the icing mitigation regime 42, the rotational speed of the second aircraft engine 10B may be controllably varied to promote intermittent ice shedding from the blades 22B of the second bladed rotor 12B. During the icing mitigation regime 42, the rotational speed of the second bladed rotor 12B may be repeatedly reduced from the second nominal rotational speed 30B to a second reduced rotational speed 32B, and thereafter increased again to the second nominal rotational speed 30B. The rotational speed of the bladed rotor 12B may be alternatingly varied between the second nominal rotational speed 30B and the second reduced rotational speed 32B. The second bladed rotor 12B may be substantially kept at the second nominal rotational speed 30B for a first time period 34B. The bladed rotor 12B may be kept at the second reduced rotational speed 32B for a second time period 36B. The second aircraft engine 10B may re-enter the nominal operating regime 40 when the icing condition is over.

The time periods 34A, 36A associated with the first aircraft engine 10A may be substantially the same or different from the respective time periods 34B, 36B associated with the second aircraft engine 10B. During the icing mitigation regime 42, the rotational speeds of the first and second aircraft engines 10A, 10B may be varied so that their second time periods 32A and 32B are out-of-phase. For example, when the rotational speed of the first aircraft engine 10A is at the first reduced rotational speed 32A, the rotational speed of the second aircraft engine 10B is at the second nominal rotational speed 30B. Similarly, when the rotational speed of the second aircraft engine 10B is at the second reduced rotational speed 32B, the rotational speed of the first aircraft engine 10A is at the first nominal rotational speed 30A. Such an out-of-phase variation of rotational speed of aircraft engines 10A, 10B may enable a more constant total propulsive thrust from engines 10A, 10B.

The phase difference may permit that not all aircraft engines (10A, 10B) are operated at the reduced rotational speed simultaneously during the icing mitigation regime 42. For example, in a four-engine aircraft, fans of outboard turbofan engines may be operated at the reduced rotational speed 32 while fans of the inboard turbofan engines remain at the nominal rotational speed 30, and vice versa. This avoids generating undesirable yaw due to a thrust imbalance between both sides of the aircraft.

In reference to FIGS. 5A and 5B, the icing mitigation regime 42 may be activated by a user or a control system of the aircraft 4. Such an activation may be triggered by detection of a potential icing condition as described above.

The first time periods 34A, 34B may of different durations as the second time periods 36A, 36B. In some embodiments, the first time periods 34A, 34B may be longer than the second time periods 36A, 36B. In some embodiments, the first time periods 34A, 34B are more than ten times longer than the respective second time periods 36A, 36B. The first time periods 34A, 34B and second time periods 36A, 36B may be determined based on a design of the blades 22, a severity of ice accumulation, or the severity of the (potential) icing condition. In some embodiments, the first time periods 34A, 34B may be 10 minutes or longer. In some embodiments, the second time periods 36A, 36B may be 30 seconds or shorter. In some embodiments, the second time periods 36A, 36B may be 5 seconds or shorter.

The nominal rotational speeds 30A, 30B may be determined based on a total thrust desired of the aircraft engine 10. In some embodiments the reduced rotational speed 32, 32A, 32B is 3-5% lower than the corresponding nominal rotational speed 30, 30A, 30B. The amount of speed reduction may be determined based on a design of the blades 22, severity of ice accumulation, or the severity of the (potential) icing condition. In some embodiments, the nominal rotational speeds (30, 30A, 30B) may be 70-100% of a maximum fan speed. In some embodiments, the reduced rotational speeds (32, 32A, 32B) may be 3-5% lower than the nominal rotational speed (30, 30A, 30B).

An example icing mitigation method may include repeatedly: allowing ice accretion by dwelling at a relatively constant rotational speed of the bladed rotor for a relatively long time (2-5 minutes); reducing the rotational speed of the bladed rotor by 3% to 5% for a relatively short time (a few seconds); and then increasing the rotational speed of the bladed rotor back to the ice accretion speed.

The changes between rotational speeds, i.e. between nominal rotational speeds (30, 30A, 30B) and the corresponding reduced rotational speeds (32, 32A, 32B) and vice-versa, are shown as being instantaneous for illustration in the figures herein but it is understood that some time would be required to achieve the changes based on characteristics (e.g., response time) of the engine(s) 10A, 10B. In some situations, an amount of time required to achieve such change in rotational speed may be less than 5 seconds for a gas turbine engine.

FIG. 5C is a graph of rotational speeds of two bladed rotors 12A, 12B of two respective aircraft engines 10A, 10B of an aircraft 4 versus time, according to another embodiment. The aircraft engines 10A, 10B may be operating in the nominal operating regime 40 where the bladed rotors 12A, 12B may be rotating at the nominal rotational speed 30. When the icing condition is identified, the first and second aircraft engines 10A, 10B may then enter the icing mitigation regime 42.

During the icing mitigation regime 42, the rotational speed of the first aircraft engine 10A may be controllably varied to promote ice shedding from the blades 22A of the first bladed rotor 12A. During the icing mitigation regime 42, the rotational speed of the first bladed rotor 12A may initially be increased from nominal rotational speed 30 to a first increase rotational speed 38A. Thereafter, the rotational speed of the first bladed rotor 12A may be repeatedly reduced from the first increased rotational speed 38A to a first reduced rotational speed 32A, and thereafter increased again to the first increased rotational speed 38A. The rotational speed of the first bladed rotor 12A may be alternatingly varied between the first increased rotational speed 38A and the first reduced rotational speed 32A. The first bladed rotor 12A may be operated at the first increased rotational speed 38A for a first time period 34A. The first bladed rotor 12A may be operated at the first reduced rotational speed 32A for a second time period 36A. As explained in relation to FIG. 5B, the first time period 34A may be (e.g., 10 or more times) longer than the second time period 36A. The first aircraft engine 10A may re-enter the nominal operating regime 40 when the icing condition is over.

The second aircraft engine 10B may also enter the icing mitigation regime 42 when the icing condition is identified. During the icing mitigation regime 42, the rotational speed of the second aircraft engine 10B may be controllably varied to promote intermittent ice shedding from the blades 22B of the second bladed rotor 12B. During the icing mitigation regime 42, the rotational speed of the second bladed rotor 12B may be decreased to the second reduced rotational speed 32B and then increased to the second increased rotational speed 38B. Thereafter, the rotational speed may be repeatedly reduced from the second increased rotational speed 38B to a second reduced rotational speed 32B, and thereafter increased again to the second increased rotational speed 38B. The rotational speed of the second bladed rotor 12B may be alternatingly varied between the second increased rotational speed 38B and the second reduced rotational speed 32B. The second bladed rotor 12B may be operated at the second increased rotational speed 38B for a first time period 34B. The bladed rotor 12B may be operated at the second reduced rotational speed 32B for a second time period 36B. As explained in relation to FIG. 5B, the first time period 34B may be (e.g., 10 or more times) longer than the second time period 36B. The second aircraft engine 10B may re-enter the nominal operating regime 40 when the icing condition is over.

In reference to FIG. 5C, the time periods 34A, 36A associated with the first aircraft engine 10A may be substantially the same from the respective time periods 34B, 36B associated with the second aircraft engine 10B. The alternating of the rotational speed of the first aircraft engine 10A may be out-of-phase with the rotational speed of the second aircraft engine 10B. The increased rotational speeds 38A, 38B above the nominal rotational speed 30 and the reduced rotational speeds 32A, 32B below the nominal rotational speed 30 may be selected so that the overall average rotational speed between the first and second aircraft engines 10A and 10B may be substantially the same as the nominal rotational speed 30. Such selection and out-of-phase variation of rotational speeds of aircraft engines 10A, 10B may enable a more constant overall amount of total propulsive thrust delivery between engines 10A, 10B.

Figure 6:
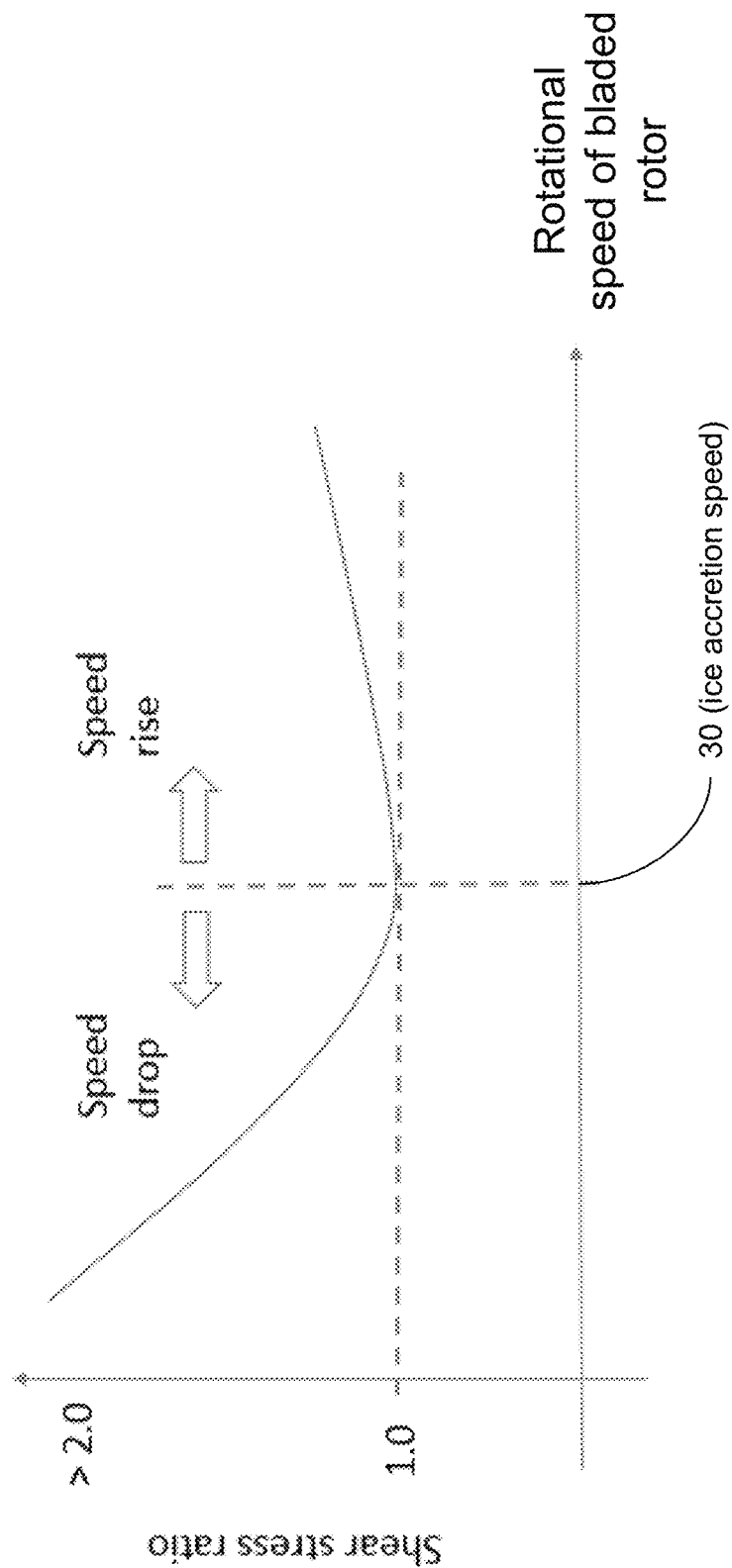
FIG. 6 is a graph of the shear stress ratio on accumulated ice on a blade of a bladed rotor of an aircraft engine as a function of the rotational speed of the bladed rotor.

FIG. 6 is an exemplary graph of the shear stress ratio on accumulated ice on the blade 22 of the aircraft engine 10 as a function of the rotation speed of the bladed rotor 12. Such a graph may depend on the design of blades 22. The higher shear stress ratio may correspond to a higher likelihood of ice shedding. Either increasing or decreasing rotational speed may increase shear stress ratio on the accumulated ice, thereby encouraging ice shedding. However, the rate of rise in stress ratio may be greater for some blade designs when the rotational speed is lowered below the nominal (ice accretion) rotational speed 30 rather than increased.

Momentarily decreasing the rotational speed of the bladed rotor 12 may cause the ice to break off from the blades 22 of the bladed rotor 12. Centrifugal forces on the blades 22 are lowered when the rotational speed of the bladed rotor 12 decreases, which may cause a change in the shape (elastic deformation) of the blades 22 due to the lowered stress in the blades 22. Additionally, the shape (deformation) of the blades 22 may change due to lower aerodynamic loading at a lower rotational speed. Ice formed on the blades 22 may not go through the same change of shape (deformation) as the blades 22 because the material properties of ice are different than those of the material of the blades 22. The resulting mismatch in deformation between the blades 22 and the ice may cause the ice to crack and/or shed. In some situations, a momentary decrease in rotational speed of the bladed rotor 12 may be more effective than a comparable momentary increase in rotational speed of the bladed rotor 12 in increasing the shear stress ratio and hence causing ice shedding.

A reason behind such an effect is believed to be that there is no restoring force acting on the ice at the ice accretion speed. Unlike the blade 22, ice would not go through the same shape change while being accrued on the blade 22. As such, when the rotational speed of the bladed rotor 12 drops below the ice accretion speed, the blade 22 would deflect/twist towards its original/resting shape while the ice is resisting such deformation. This mechanism for ice shedding may be similar to dislodging ice cubes from an ice tray by twisting the ice tray.

FIG. 6 is indicative of the shear stress ratio behaviour with respect to rotational speed for an exemplary fan blade of a turbofan engine. However, the methods and systems described herein could also be used to promote ice shedding from other types of bladed rotors (e.g., propeller(s) of a turboprop aircraft, helicopter rotor(s)) that have blades that exhibit a behaviour that is conducive to causing ice shedding with a momentary rotational speed reduction.

Figure 7:
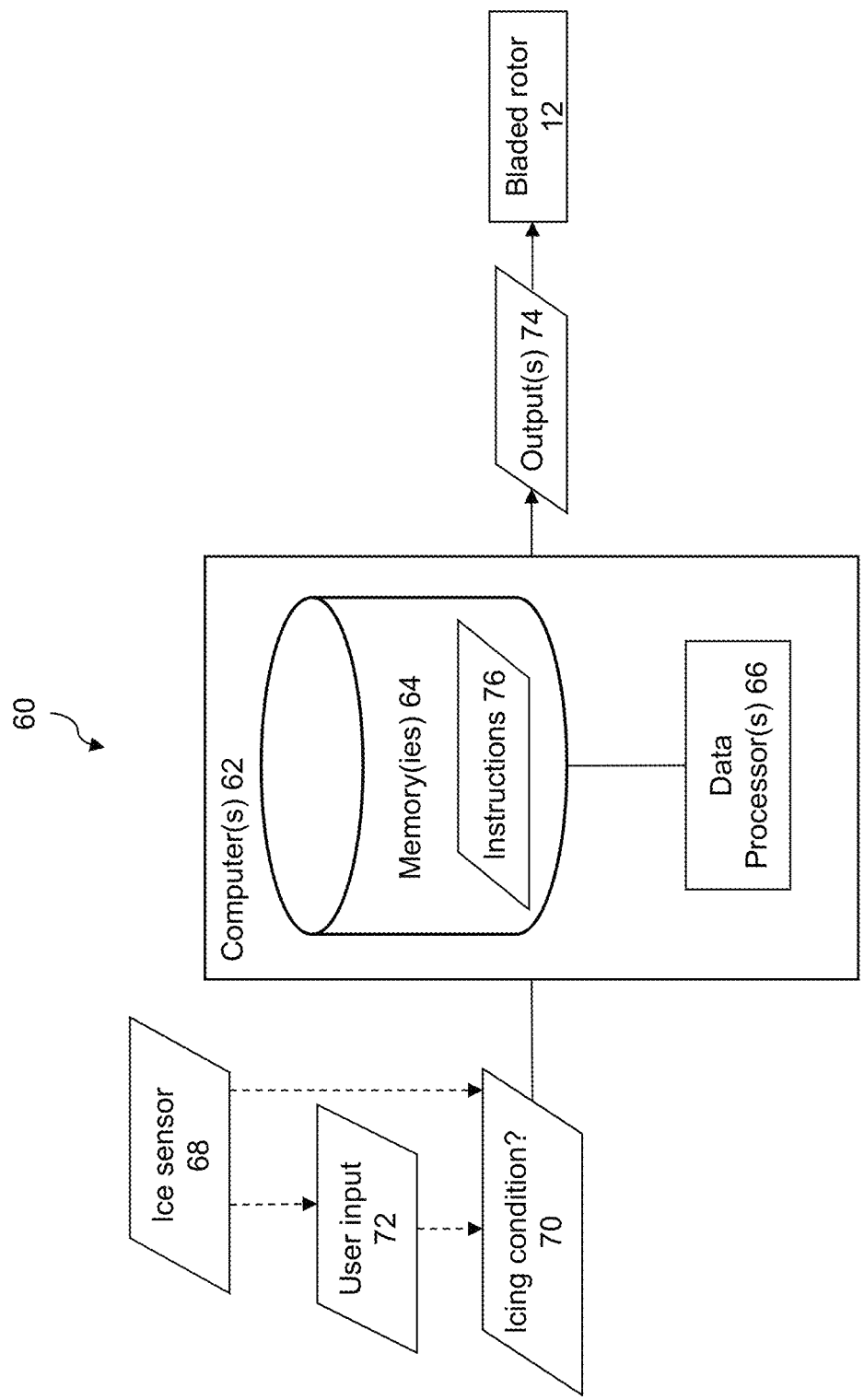
FIG. 7 is a schematic of a system to promote ice shedding from blades of a bladed rotor of an aircraft engine.

FIG. 7 is a schematic of an exemplary system 60 to promote ice shedding from blades 22 of a bladed rotor 12 of an aircraft engine 10. The system 60 may be used to perform the methods disclosed herein. The system 60 comprises one or more data processors 66 operatively coupled to control a rotational speed of the bladed rotor 12. The system 60 also includes non-transitory machine-readable memory 64 storing instructions 76. The instructions 76 may be executable by the one or more data processors 66 and are configured to, based on input 70 indicative of potential icing condition, cause the one or more data processors 66 to generate an output 74 causing the bladed rotor 12 to alternatingly achieve the nominal rotational speed 30 or increased rotational speed 38A, 38B of the bladed rotor 12 at which ice accretion on blades 22 of the bladed rotor 12 occurs, and the reduced rotational speed 32 of the bladed rotor 12 to promote ice shedding from the blades 22 of the bladed rotor 12. As explained above, the reduced rotational speed 32 is lower than the nominal rotational speed 33.

In some embodiments, the data processor(s) 66 may be part of an electronic engine controller (EEC) of the engine 10.

The input 70 indicative of an icing may be based on input from a user 72 (e.g. pilot or operator), ice sensor 68, or an upstream control system.

In some embodiments of the system 60, the instructions 76 are configured to cause the one or more data processors 66 to generate an output 74 causing the bladed rotor 12 to alternatingly achieve the nominal rotational speed 30 or increased rotational speed 38A, 38B for the first time period 34 and the reduced rotational speed 32 for the second time period 36.

In some embodiments of the system 60, the first time period 34 is longer than the second time period 36. In some embodiments of the system, the first time period 34 is more than ten times longer than the second time period 36.

In some embodiments of the system 60, the instructions 76 are configured to, based on input 70 indicative of potential icing condition, cause the one or more data processors 66 to generate an output causing the bladed rotor 12 to monotonically increase the bladed rotor's 12 rotational speed from the reduced rotational speed 32 to the nominal rotational speed 30.

In some embodiments of the system 60, the instructions 76 are configured to cause the one or more data processors 66 to generate an output 74 causing the bladed rotor 12 to monotonically decrease the bladed rotor's 12 rotational speed from the reduced rotational speed 32 to the nominal rotational speed 30.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, even though the systems and methods described herein may be useful in promoting ice shedding from blades of fans of turbofan engines, the systems and methods described herein may also be used to promote ice shedding from other types of bladed rotors. Yet further modifications could be implemented by a person of ordinary skill in the art in view of the present disclosure, which modifications would be within the scope of the present technology.

What is claimed is:

1. A method of operating an aircraft engine having a bladed rotor coupled thereto during an icing condition, the method comprising:

controlling the aircraft engine to alternatingly achieve an ice accretion rotational speed of the bladed rotor at which ice accretion on blades of the bladed rotor occurs, and a reduced rotational speed of the bladed rotor to promote ice shedding from the blades of the bladed rotor, the reduced rotational speed being lower than the ice accretion rotational speed.

2. The method of claim 1, wherein a first time period at which the aircraft engine is controlled to achieve the ice accretion rotational speed of the bladed rotor is longer than a second time period at which the aircraft engine is controlled to achieve the reduced rotational speed of the bladed rotor.

3. The method of claim 2, wherein the first time period is more than ten times longer than the second time period.

4. The method of claim 1, wherein a frequency of alternatingly achieving the ice accretion rotational speed of the bladed rotor and the reduced rotational speed of the bladed rotor is based on a severity of ice accumulation on the bladed rotor.

5. The method of claim 1, wherein alternatingly achieving the first ice accretion rotational speed and the reduced rotational speed includes:
monotonically decreasing the bladed rotor's rotational speed from the ice accretion rotational speed to the reduced rotational speed; and
monotonically increasing the bladed rotor's rotational speed from the reduced rotational speed to the ice accretion rotational speed.

6. The method of claim 1, wherein the reduced rotational speed is between 95% and 97% of the ice accretion rotational speed.

7. The method of claim 1, wherein:
the aircraft engine is a first aircraft engine;
the bladed rotor is a first bladed rotor;
the ice accretion rotational speed is a first ice accretion rotational speed;
the reduced rotational speed is a first reduced rotational speed;
the method includes operating a second aircraft engine having a second bladed rotor coupled thereto by controlling the second aircraft engine to alternatingly achieve a second ice accretion rotational speed of the second bladed rotor at which ice accretion on blades of the second bladed rotor occurs, and a second reduced rotational speed of the second bladed rotor to promote ice shedding from the blades of the second bladed rotor, the second reduced rotational speed being lower than the second ice accretion rotational speed,
wherein:
alternatingly achieving the first ice accretion rotational speed and the first reduced rotational speed of the first bladed rotor is out-of-phase with alternatingly achieving the second ice accretion rotational speed and the second reduced rotational speed of the second bladed rotor; and
the first and second aircraft engines are mounted to a same aircraft.

8. The method of claim 7, wherein:
the first and second ice accretion rotational speeds are substantially equal; and
the first and second reduced rotational speeds are substantially equal.

9. The method of claim 7, wherein when the second bladed rotor is rotating at the second reduced rotational speed, the first bladed rotor is rotating at the first ice accretion rotational speed.

10. The method of claim 7, wherein when the first bladed rotor is rotating at the first reduced rotational speed, the second bladed rotor is rotating at the second ice accretion rotational speed.

11. The method of claim 7, comprising operating each of the first and second aircraft engines at a substantially same nominal rotational speed of the first and second bladed rotors before operating the second aircraft engine to alternatingly achieve the second ice accretion rotational speed and the second reduced rotational speed of the second bladed rotor, and also before operating the first aircraft engine to alternatingly achieve the first ice accretion rotational speed and the first reduced rotational speed of the first bladed rotor, wherein:
the first and second ice accretion rotational speeds are higher than the nominal rotational speed; and
the first and second reduced rotational speeds are lower than the nominal rotational speed.

12. The method of claim 1, wherein the bladed rotor is a fan and the aircraft engine is a turbofan engine.

13. A method of operating an aircraft engine having a bladed rotor coupled thereto during an icing condition, the method comprising:
operating the aircraft engine to achieve a rotational speed of the bladed rotor at which ice accretion on blades of the bladed rotor occurs;
promoting ice to shed from the blades of the bladed rotor by operating the aircraft engine to reduce the rotational speed of the bladed rotor; and
after promoting ice shedding from the blades of the bladed rotor, operating the aircraft engine to increase the rotational speed of the bladed rotor.

14. The method of claim 13, wherein promoting ice shedding from blades of the bladed rotor includes reducing the rotational speed of the bladed rotor by between 3% and 5%.

15. The method of claim 13, wherein:
the aircraft engine is a first aircraft engine;
the bladed rotor is a first bladed rotor;
the method includes:
operating a second aircraft engine to achieve a rotational speed of a second bladed rotor of the second aircraft engine at which ice accretion on blades of the second bladed rotor occurs;
promoting ice to shed from the blades of the second bladed rotor by operating the second aircraft engine to reduce the rotational speed of the second bladed rotor; and
after promoting ice shedding from the blades of the second bladed rotor, operating the second aircraft engine to increase the rotational speed of the second bladed rotor; and
the first and second aircraft engines are mounted to a same aircraft.

16. The method of claim 15, wherein promoting ice to shed from the blades of the first bladed rotor and promoting ice to shed from the blades of the second bladed rotor are performed at different times.

17. The method of claim 13, wherein the bladed rotor is a fan and the aircraft engine is a turbofan engine.

18. A system to promote ice shedding from blades of a bladed rotor of an aircraft engine, the system comprising:
one or more data processors operatively coupled to control a rotational speed of the bladed rotor; and
non-transitory machine-readable memory storing instructions executable by the one or more data processors and configured to cause the one or more data processors to:

generate an output causing the bladed rotor to alternatingly achieve an ice accretion rotational speed of the bladed rotor at which ice accretion on blades of the bladed rotor occurs, and a reduced rotational speed of the bladed rotor to promote ice shedding from the blades of the bladed rotor, the reduced rotational speed being lower than the ice accretion rotational speed.

19. The system of claim 18, wherein:

the non-transitory machine-readable memory stores instructions executable by the one or more data processors and configured to cause the one or more data processors to cause the bladed rotor to alternatingly achieve the ice accretion rotational speed for a first time period and the reduced rotational speed for a second time period; and the first time period is longer than the second time period.

20. The system of claim 19, wherein:

the first time period is ten or more times longer than the second time period; and the reduced rotational speed is between 95% and 97% of the ice accretion rotational speed.

\* \* \* \* \*